United States Patent [19]
Sharp

[11] 3,715,932
[45] Feb. 13, 1973

[54] SPEED REDUCER

[75] Inventor: Theo F. Sharp, South Bend, Ind.

[73] Assignee: Reliance Electric Company, Mishawaka, Ind.

[22] Filed: Nov. 9, 1970

[21] Appl. No.: 87,703

[52] U.S. Cl. ..................74/425, 165/47, 165/105
[51] Int. Cl. ..........F16h 1/16, F24h 3/00, F28d 15/00
[58] Field of Search .....74/467, 425; 165/105, 47, 86

[56] References Cited

UNITED STATES PATENTS

| 3,621,908 | 11/1971 | Pravda | 60/39.51 R |
| 2,743,384 | 4/1956 | Turner | 165/105 UX |
| 2,813,698 | 11/1957 | Lincoln | 165/105 X |
| 3,151,669 | 10/1964 | Quenneville | 165/47 X |
| 3,229,759 | 1/1966 | Grover | 165/105 |
| 3,481,439 | 12/1969 | Finkin | 165/105 X |
| 3,563,309 | 2/1971 | Basiulis | 165/105 |
| 3,595,304 | 7/1971 | McHugh | 165/105 |
| 3,605,878 | 9/1971 | Coleman | 165/105 |

*Primary Examiner*—Leonard H. Gerin
*Attorney*—Hobbs & Green, Kemon, Palmer & Estabrook

[57] ABSTRACT

A mechanical power transmission means in which there is a driving element, a driven element, and a shaft on which one of the elements is mounted. The shaft contains a chamber with a heat pipe system therein for transmitting heat generated in or transferred to the element on said shaft, to a point remote from the element for regulating the temperature in the power transmission means. The present concept is particularly adapted to speed reducers of the worm and gear type.

15 Claims, 10 Drawing Figures

INVENTOR.
THEO F. SHARP
BY *Hobbs & Green*
ATTORNEYS

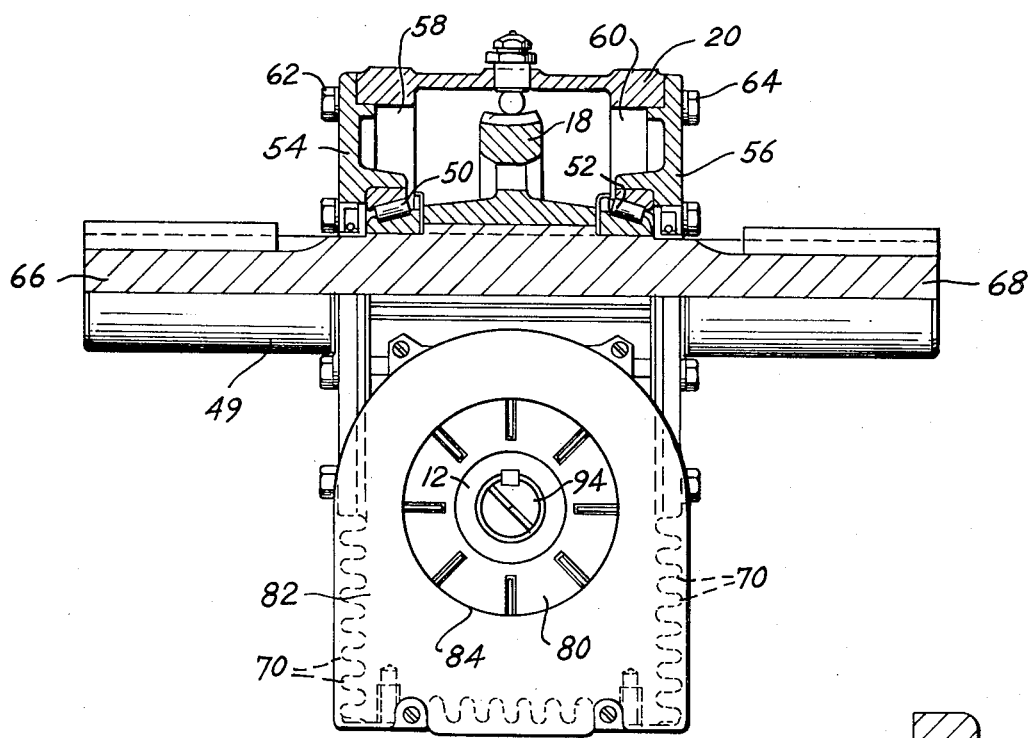
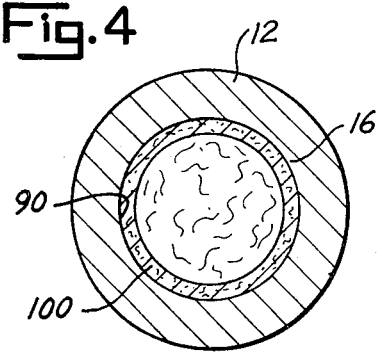
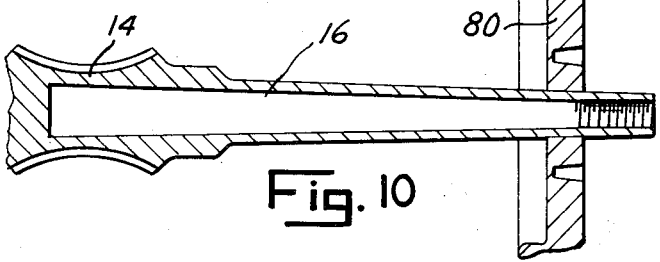

PATENTED FEB 13 1973 3,715,932
SHEET 3 OF 3
Fig. 5
THERMAL RESISTANCES
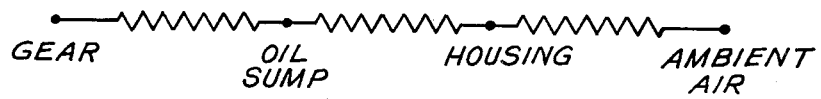
GEAR — OIL SUMP — HOUSING — AMBIENT AIR
Fig. 6
WITHOUT HEAT PIPE WITH HEAT PIPE
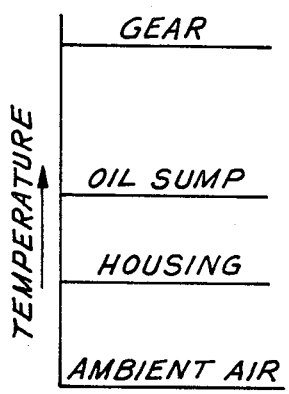 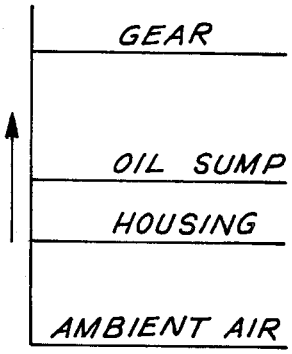
Fig. 7
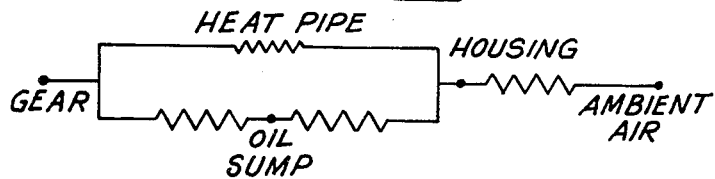
Fig. 8
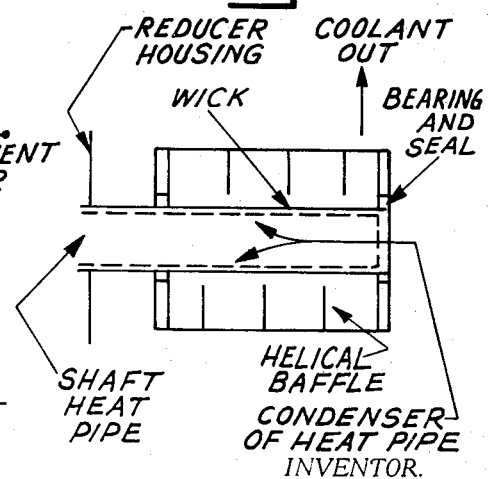
Fig. 9
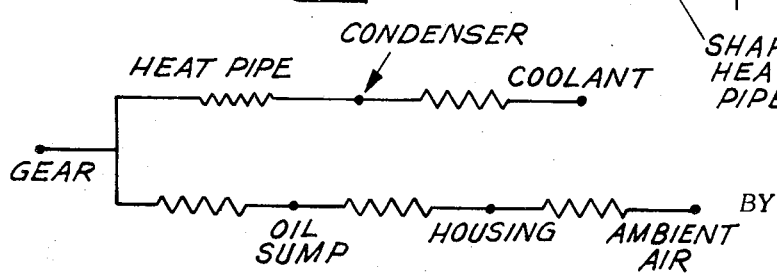
INVENTOR.
THEO F. SHARP
BY Hobbs & Green
ATTORNEYS

SPEED REDUCER

The operation of speed reducers of the worm and gear reduction type produces a substantial amount of heat from the friction of the intermeshing gears, and this heat tends to build up as the operation continues, resulting in over heating of the lubricating oil. As the oil becomes warmer, its lubricating qualities diminish, thus creating further frictional heat and a substantial rise in the temperature of the lubricant. In the past, excessive increases in temperature of the speed reducer gears and lubricant have been prevented or controlled by using the circulating lubricant to remove the heat from the gears, and thereafter cooling the lubricant by dissipating the heat through the gear reducer housing into the atmosphere. The housing is normally provided with fins on one or more areas to improve the efficiency of heat transfer through the housing and the dissipation into the ambient air. This type of heat dissipating system had certain inherent disadvantages, one of which has been the adverse effect of the heat on the lubricant, which not only becomes less effective as a lubricant during the critical operating periods of the reducers as a result of the increase in temperature, but also decomposes or is otherwise permanently altered so that frequent lubricant changes are necessary. It is, therefore, one of the principal objects of the present invention to provide gear reduction units having a gear cooling system which removes the heat from the gears before it has caused any appreciable increase in the temperature of the lubricant in the unit, and which can be incorporated in most conventional or standard gear reduction units without making any substantial changes or modification in the basic design thereof.

Another object of the invention is to provide a cooling system for the gears of a speed reducer which is incorporated in the shaft or hub of one or more gears of the unit for removing the heat instantaneously from the gears as it is produced by the friction between the intermeshing gear teeth, thereby preventing the temperature of either the gears or the lubricant from increasing to a point where the operation or function of either will be impaired.

Still another object of the invention is to provide a relatively simple, highly efficient cooling system for gear reduction units which effectively protects the moving parts and the lubricant of the units, and which has no complicated parts or mechanisms likely to fail or wear excessively over extended periods of operation of the gear reduction units.

Another object is to provide a cooling system for the shafts of various types of machinery having driving and driven elements, which is economical and efficient to operate, and which can be maintained in optimum operating condition over long periods of time with a minimum amount of service.

Additional objects and advantages of the invention will become apparent from the following description and accompanying drawings, wherein:

FIG. 2 is an elevational and partial cross sectional view of another side of the reducer showing a portion of the worm gear in cross section;

FIG. 4 is an enlarged cross sectional view of the worm shaft, the section being taken on line 4—4 of FIG. 3; and FIGS. 5 through 9 are diagrammatical views of various conditions prevailing in speed reducer units, illustrating the function and effectiveness of the present improvement; and FIG. 10 is a cross sectional view of a modified form.

Figure 1:
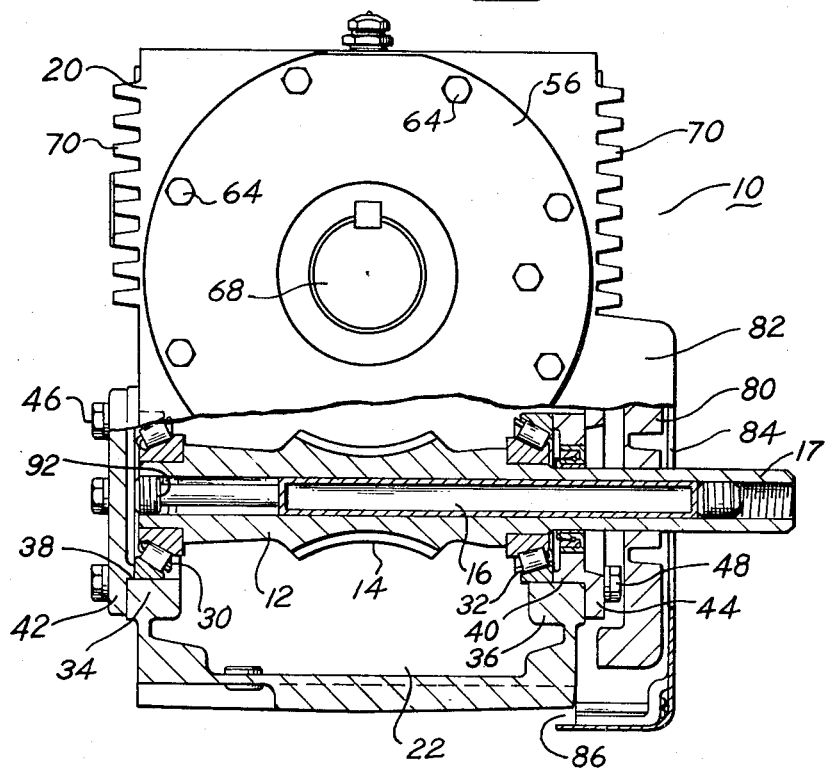
FIG. 1 is an elevational and partial cross sectional view of a worm gear speed reducer showing the worm in cross section.
Figure 3:
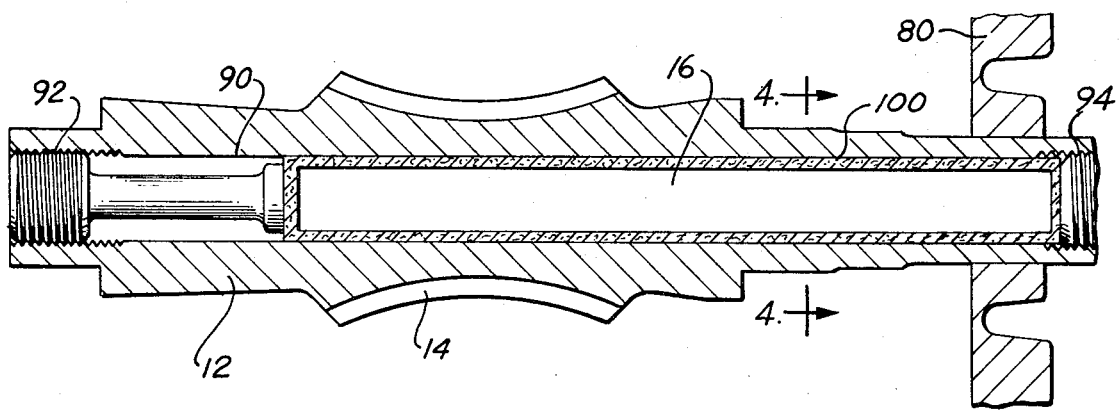
FIG. 3 is an enlarged view of the worm shaft showing in greater detail the cooling mechanism embodied therein.

The present invention is primarily concerned with the dissipation of friction generated heat from intermeshing gears, particularly in speed reducers of the worm and gear type, and involves the utilization of a heat pipe system incorporated in the rotating shaft of the worm. A conventional worm gear speed reducer with self-contained oil lubrication has a heat-flow or heat dissipation pattern given essentially by the thermal circuit shown in FIG. 5. The head generated in the gear is first transferred to the lubricating oil, which in turn heats the housing, and the heat is dissipated from the housing surface to the ambient air by conventional modes, such as natural convection without a fan, or forced convection with a fan, augmented in some degree by radiation. Since the highest temperature is at the gear, and since the thermal resistances from the worm or gear to ambient air are essentially in series, the temperatures are successively lower at the oil sump, housing, and the ambient air. Under normal conditions the limiting temperature usually occurs in the oil sump, in that when the oil temperature becomes too high, the oil deteriorates and loses its effective lubricating properties.

A heat pipe system, including wick type or rotating wickless type utilized in the present concept, is an excellent heat conductor, its thermal conductivity normally being many times greater than that for pure copper, and when incorporated in the shaft of a conventional worm gear speed reducer, greatly improves the performance of such a reducer. As used in the present concept, the heat pipe in its broadest sense consists essentially of an evaporator where heat is absorbed, a condenser where heat is rejected, and a means for transporting the liquid condensate from the condenser to the evaporator. The advantages of the heat pipe in a speed reducer or similar mechanism is illustrated by the diagrams of FIG. 6 which compares the dissipation of heat from a speed reducer with the heat pipe incorporated therein with the dissipation of heat from a conventional speed reducer. The heat pipe system is not a substitute for the conventional heat dissipating system, but rather is in addition thereto, providing a second and superior path of thermal flow from the gear and worm to ambient air, as illustrated by the diagram of FIG. 7. It is seem that the heat pipe is represented by a parallel resistance, since it transmits part of the heat generation directly to the housing, leaving the rest to go through the usual route. The net effect of utilizing heat pipe is to reduce the temperature level at the gear and in the oil. The reductions in temperature at these critical points improve the service life of the reducer.

The heat dissipating capacity of the present system is further improved by connecting the reducer shaft directly to an external heat exchanger. An example of such an arrangement is shown in FIG. 8 wherein the coolant through the heat exchange may be either air, water or oil. The thermal circuit for this configuration is depicted in FIG. 9. In view of the low resistance of the heat pipe, most of the heat generated at the gear is directly dissipated in the heat exchanger, with a small portion going through the usual route of oil, housing and ambient air. This design has a much higher thermal capacity for given allowable gear and oil temperatures, when compared with that of the conventional reducer.

Referring to the specific reducer embodiment illustrated in the drawings, numeral 10 indicates generally the worm gear speed reducer, 12 a worm shaft having threads 14 thereon and a cooling system or mechanism 16 therein. Shaft 12 is driven by a gear, sheave or other drive element mounted on or connected to shaft end 17, and worm threads 14 intermesh with and drive a worm gear 18. A housing indicated generally by numeral 20 encloses the worm and gear and is provided with a sump 22 for a lubricant for the gears and shaft bearings. The worm thread may be of any standard type, and hence is only shown in outline form in the drawings. While the present cooling system 16 is shown in conjunction with a worm gear speed reducer, it can be used beneficially with other types of shafts for intermeshing gears where the friction produced heat from the intermeshing gears must be dissipated in order to obtain optimum operating performance.

Worm 12 is journalled in bearings 30 and 32, which in turn are mounted in the housing in annular bosses 34 and 36, respectively, the annular bosses containing holes 38 and 40 which are closed by plates 42 and 44 secured to the housing by a plurality of bolts 46 and 48. Worm gear 18 is mounted on a shaft 49 journalled in bearings 50 and 52, which in turn are mounted in plates 54 and 56, respectively, disposed in housing openings 58 and 60 and secured to the housing by a plurality of bolts 62 and 64, respectively. The shaft for the worm gear is of the double output type having portions 66 and 68 at each end of the shaft for receiving gears, sheaves or other drive elements. While a double output shaft is shown, the reducer may instead have a single output shaft if desired. The housing is shown with a plurality of fins 70 on the external surface thereof for dissipating the heat transmitted through the adjacent housing sidewall from the lubricant in the housing during the operation of the reducer, although the necessity for the fins is minimized by the cooling system hereinafter described.

An impeller 80 mounted on the shaft of the worm for rotation therewith is used to circulate air around the housing and fins in order to provide effective heat dissipation from the gear reducer. The impeller is enclosed in a shield 82 having an air intake 84 concentric with the shaft, and various outlet openings 86 around its periphery, which direct the air from the impeller to the various surfaces of the reducer housing.

Since most of the heat generated by friction between the gears occurs between the worm threads and the teeth of the worm gear, a heat pipe system 88 is disposed in the center of the shaft 12 and extends axially therein from a position adjacent the threaded section of the worm, where the heat is absorbed, to one end of the shaft where the heat is dissipated into the ambient air, either directly or through a heat exchanger. The specific embodiment of the heat pipe shown in the drawing consists of a closed evacuated chamber 90 in the shaft, closed at the left hand end by threaded plug 92, and at the right hand end by a plug 94 threaded into the otherwise open end of the shaft, the plugs forming effective seals with the sides of the shaft so that chamber 90 will maintain its evacuated condition for extended periods of operation.

The heat pipe shown is of the wick type, although a rotating wickless type is suitable for the present operation. In the one shown, capillary structure or wick 100 lines the wall of chamber 90, extending the full length thereof, and may consist of a variety of different materials capable of producing an effective capillary action, examples of such materials being fiber glass, woven mesh, or sintered porous matrices. The working fluid in the heat pipe may likewise be of a variety of different materials, consisting, for example, of methanol, acetone, water, and fluoridated hydrocarbons, which will readily vaporize within the temperature range normally encountered during the operating of the speed reducer. While the shaft is shown in the drawings as forming the walls of chamber 90, a separate container having side walls of a high heat conductivity material, such as copper or aluminum, may be constructed separately and fitted snugly into the center bore of the shaft as a complete unit.

In the rotating wickless or centrifugal embodiment, the return of the condensate from the condenser to the evaporator is accomplished by centrifugal action of a rotating shaft having an axial bore which increases in diameter from the condenser at the end of the shaft to the evaporator at the center, as illustrated diagrammatically in FIG. 10. The design of the wall of the bore causes the condensed fluid to move from the heat dissipating end to the heat absorbing end as the shaft rotates during operation of the speed reducer. In some installations, the embodiment involving the true capillary action may be preferred, since it not only functions effectively throughout the operating of the reducer, but continues to function after the reducer has stopped operating to dissipate the residual heat in the gears and shaft.

In the operation of the heat pipe system, the heat generated by the operation of the worm and worm gear is transmitted through the walls of shaft 12 to the adjacent end of the heat pipe, where it heats the working fluid in wick 100, causing the fluid to evaporate from the wick to increase the vapor pressure in the corresponding end of chamber 90. As a result, the vapor moves along the chamber carrying the heat energy toward the right hand end of the chamber, as viewed in the drawings, where the heat is dissipated through the side walls of the shaft and carried away by the air circulated under cover 84 by the operation of impeller 80 and/or other suitable heat dissipating means such as fins. When the heat is removed from vapor in the right hand end of the chamber, the vapor condenses, entering wick 100, and returns in liquid form by capillary action to the inner end of the chamber 90. This operational cycle of heat absorption and vaporization, and then heat dissipation and condensation, continues indefinitely without interruption as long as there is a differential in temperature between the gears and the heat dissipating means at the outer end of the shaft, thus providing optimum operating performance of the speed reducer and effective protection to the unit.

While the present invention has been described with reference to a speed reducer, the broader concept includes transmission of heat from a driving or driven element through a shaft on which one of the elements is mounted, to a dissipating point remote from the element. Various shaft structures and designs and drive and driven elements thereon can be effectively cooled by the present cooling system.

Although only one embodiment has been described, various changes and modifications may be made without departing from the scope of the invention.

I claim:

1. A speed reducer comprising a worm having a threaded portion thereon, a worm gear shaft having teeth intermeshing with the threads on said worm and having a longitudinally arranged chamber therein extending from a point in close proximity to said threaded portion to a point remote therefrom, a heat pipe system in said chamber having an evaporator end in close proximity to to said threaded portion and a condenser end remote therefrom and a fluid therein vaporized by the heat generated by the intermeshing threads and teeth for transferring the heat to said remote point, and a means for dissipating the heat from said remote point.

2. A speed reducer as defined in claim 1 in which a housing is provided for said worm and gears and said shaft extends through the wall of said housing and a heat dissipating means is associated with the shaft externally with respect to said housing.

3. A speed reducer as defined in claim 2 in which said heat dissipating means includes an impeller mounted on said shaft for circulating air about the shaft.

4. A speed reducer as defined in claim 1 in which the chamber includes a capillary active material extending substantially the full length thereof.

5. A speed reducer as defined in claim 4 in which a capillary active material is selected from a group of materials including sintered porous matrices, woven mesh, and fiber glass.

6. A speed reducer as defined in claim 5 in which said fluid is selected from a group consisting of methanol, acetone, water and fluoridated hydrocarbons.

7. A speed reducer as defined in claim 1 in which said fluid is selected from a group consisting of methanol, acetone, water and fluoridated hydrocarbons.

8. A speed reducer as defined in claim 1 in which said heatpipe system is a wickless, rotating shaft type.

9. A speed reducer as defined in claim 1 in which said system includes a bore in said shaft increasing in diameter from one end thereof toward said inner end of said chamber.

10. A mechanical power transmitting means including a driving element and a driven element, a housing for said elements, a shaft rotatably supporting one of said elements and extending through the wall of said housing, said shaft having a longitudinally arranged chamber therein extending from a point in close proximity to said element to a point remote therefrom, a heat pipe system in said chamber having an evaporator end in close proximity to said threaded portion and a condenser end remote therefrom and a fluid therein vaporized by heat transmitted from said element to said shaft for transferring the heat to said remote point and associated with said shaft for dissipating the heat from the shaft.

11. A mechanical power transmitting means as defined in claim 10 in which the chamber includes a capillary active material extending substantially the full length thereof.

12. A mechanical power transmitting means as defined in claim 11 in which a capillary active material is selected from a group of materials including sintered porous matrices, woven mesh, and fiber glass.

13. A mechanical power transmitting means as defined in claim 12 in which said heat pipe includes a bore in said shaft decreasing in diameter toward an outside end thereof.

14. A mechanical power transmitting means as defined in claim 10 in which said fluid is selected from a group consisting of methanol, acetone, water and fluoridated hydrocarbons.

15. A mechanical power transmitting means as defined in claim 10 in which said heat pipe system is a wickless, rotating shaft type.

* * * * *